(12) United States Patent
Hansen

(10) Patent No.: US 6,499,517 B2
(45) Date of Patent: Dec. 31, 2002

(54) BATCH DISPENSING SYSTEM FOR FLUIDS

(75) Inventor: Henning Max Hansen, Sønderborg (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 10/125,315

(22) Filed: Apr. 18, 2002

(65) Prior Publication Data

US 2002/0139437 A1 Oct. 3, 2002

Related U.S. Application Data

(62) Division of application No. 09/780,753, filed on Feb. 9, 2001.

(30) Foreign Application Priority Data

Feb. 11, 2000 (DK) .......................................... 2000 00216

(51) Int. Cl.⁷ ................................................ B65B 1/04
(52) U.S. Cl. ............................ 141/196; 141/83; 141/94
(58) Field of Search ................................ 141/196, 192, 141/198, 94, 95, 83, 9, 100, 104, 2, 18, 98; 73/861.354, 861.355, 861.356, 861.357

(56) References Cited

U.S. PATENT DOCUMENTS

| | | | |
|---|---|---|---|
| 4,200,203 A | | 4/1980 | Rider |
| 5,431,302 A | | 7/1995 | Tulley |
| 5,522,438 A | * | 6/1996 | Gustafsson et al. ............ 141/1 |
| 5,743,357 A | * | 4/1998 | Few ............................ 141/98 |
| 5,913,344 A | | 6/1999 | Wronski |
| 5,975,747 A | | 11/1999 | Flaherty |
| 5,996,650 A | * | 12/1999 | Phallen et al. .............. 141/192 |
| 6,186,193 B1 | * | 2/2001 | Phallen et al. .............. 141/100 |

FOREIGN PATENT DOCUMENTS

WO    WO 86/04572 A1    8/1986

* cited by examiner

Primary Examiner—Steven O. Douglas
(74) Attorney, Agent, or Firm—Lee, Mann, Smith, McWilliams, Sweeney & Ohlson

(57) ABSTRACT

A system for dispensing batches of fluid comprising a flowmeter (5), a pump or valve (6) for starting and stopping the flow and a controller (9) for controlling the pump or the valve. In order to reach a target batch size, the settling time at start of the flowmeter is compensated for as well as for the time it takes to stop the flow by generating a stop signal before the target batch size is reached. Further, to compensate for variations in the actual flow caused by variations in the feed pressure and the like, the compensation is made a function of the actually measured flow. A controller or a batch flow meter for use in dispensing batches is equipped with an interface for setting a compensating time constant and a correction unit for compensation of changes in the flow. The correction unit can consist of a differentiator an a summation circuit. Using digital techniques, the correction unit can be made as a lead filter.

5 Claims, 9 Drawing Sheets

BATCH DISPENSING SYSTEM FOR FLUIDS

RELATED APPLICATION

This application is a division of co-pending U.S. patent application Ser. No. 09/780,753, filed Feb. 9, 2001.

The present invention is concerned with systems for dispensing fluid in batches of a desired size, that is, a desired mass or volume.

The dispensing of fluids in batches of a desired size is a very common operation in many branches of industry. The term fluids in this connection covers a broad variety of flowable media such as true liquids, for example mineral oil products, beverages and liquid foodstuffs, gases, flowable solids such as fine powders, slurries etc. An example is the filling of containers for sale. The containers must be filled quickly to an exact amount. Repeated overfilling is as unacceptable for reasons of economy as repeated underfilling which might be considered fraudulent by customers or regulatory bodies. Incidents of container overflow because of excess overfilling, which can lead to contamination of production facilities, production stoppage and even dangerous situations such as fire hazard, must also be avoided.

A typical batch dispensing system comprises a fluid duct equipped with a flowmeter and an electrically controlled flow controller, such as a valve or a pump, for starting and stopping fluid flow to a dispensing nozzle or the like. The valve or pump is controlled by a control unit which receives the flowmeter's output signal (the flow signal). The control unit includes a facility for setting a desired batch size, a start signal generator, an integrator or accumulator for integrating the flow signal over time and a comparator for generating a stop signal when the integrated or accumulated flow signal equals the desired batch size. The accumulator is reset to zero after each batch. Flowmeter, valve or pump and control unit may be separate or integrated units. The fluid to be dispensed is typically led to the dispensing system from a storage tank, a pressurized container, a feed pressure generating pump or the like via a length of tubing.

The starting and stopping of the fluid flow in a dispensing system of the kind described makes it difficult to dispense exact batches. Most flowmeters follow changes in flow rate only with a certain time lag. Thus the measured flow will be smaller than the actual flow at least for some time after start, and the mass or volume measured by integration of the measured flow will be less than the actual mass or volume dispensed. Valves and pumps also take a certain time to close or stop which means that the integrator must develop a stop signal ahead of the time when flow must actually stop to result in an exact batch.

These problems are addressed in U.S. Pat. No. 5,431,302. The document describes a batch dispensing system with a flow controlling valve wherein the actual overfill is averaged over a number of batches. The average overfill is then used to cause an earlier closure of the valve so that subsequent batches will be filled exactly.

However the batch metering problem is compounded by the fact that typically the feed pressure of the fluid to be dispensed and thus the maximum flow rate occurring in each individual batch is not constant over time. In the general examples given above, the feed pressure decreases with the fluid head in the storage tank, or with the pressure in the pressurized container, as they are increasingly emptied. In more complicated process environments quite erratic feed pressure variations may occur. This is a problem which cannot be solved with the approach of U.S. Pat. No. 5,431, 302.

SUMMARY OF THE INVENTION

To address this problem, the present invention provides a system for dispensing batches of fluid which comprises flow controlling means for starting a flow of fluid in response to a start signal and for subsequently stopping the flow of fluid in response to a stop signal, a flowmeter for measuring a flow rate of the fluid and generating a flow signal corresponding thereto, and a batch controller for generating the start signal, the batch controller receiving the flow signal and generating the stop signal in response thereto. The batch controller comprises storage means for storing a target batch size representation, integrating means for integrating the flow signal over time to develop a measured batch size representation, comparator means for comparing the target batch size representation with measured batch size representation and generating the stop signal when they are equal, and modifying means for modifying at least one of the target batch size representation and the measured batch size representation in response to the flow signal.

The system according to the invention alleviates the problem of variations in feed pressure by providing a correction in response to the actually observed flow, instead of a correction based on a forecast from past history.

The correction principles associated with the invention may also applied to batch controllers for controlling batch dispensing systems, and to flowmeters for use in such systems.

BRIEF DESCRIPTION OF THE DRAWINGS

Preferred embodiments of the invention will now be described below with reference to the accompanying drawings.

DESCRIPTION OF THE PREFERRED EMBODIMENTS

Figure 1:
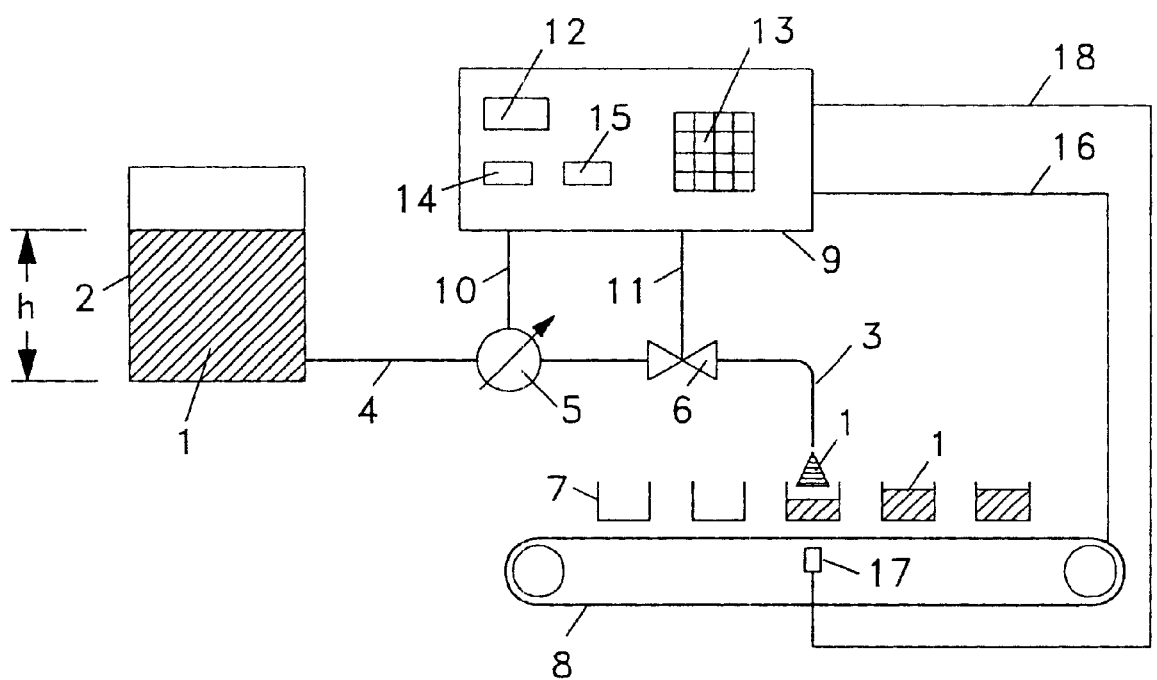
FIG. 1 is a schematic drawing of a typical batch dispensing system.

In the batch dispensing system of FIG. 1, liquid 1 from a storage tank 2 is fed to a dispensing nozzle 3 via a feed line 4 equipped with an electronic flowmeter 5 and an electrically controlled shut-off valve 6. Containers 7 to be filled with the liquid are conveyed to the nozzle 3 on a conveying system 8. The dispensing operation is controlled by a batch controller 9.

The batch controller receives a flow signal 10 from the flowmeter 5 which indicates the instantaneous flow rate in the feed line 4 and thus the instantaneous flow rate of the liquid 1 dispensed at the nozzle 3. Depending on the application the flowmeter may be a mass flowmeter or a volume flowmeter. The controller transmits start and stop signals 11 to the shutoff valve 6 to control the flow leaving the nozzle 3. The valve opens on receiving a start signal and closes on receiving a stop signal.

The controller 9 has a display 12, a keyboard 13, a start button 14 and a stop button 15. The keyboard is used to enter a target batch size (a desired mass or volume of liquid to be filled into each container). Once the target batch size has been set and stored in the controller, the dispensing operation is started with the start button 14. The controller operates the conveying system 8 via line 16 to convey a first container 7 into position below the nozzle 3, where its presence is detected by a sensor 17 and signaled to the controller via line 18. The controller then sends the start signal on line 11 to the valve 6 to start the flow and later sends the stop signal on line 11 to stop the flow when it has been determined from an integration of the flow signal 10 that the target batch size has been dispensed into the container 7. The conveying and dispensing sequence is repeated until the stop button 15 on the controller is actuated.

Figure 2:
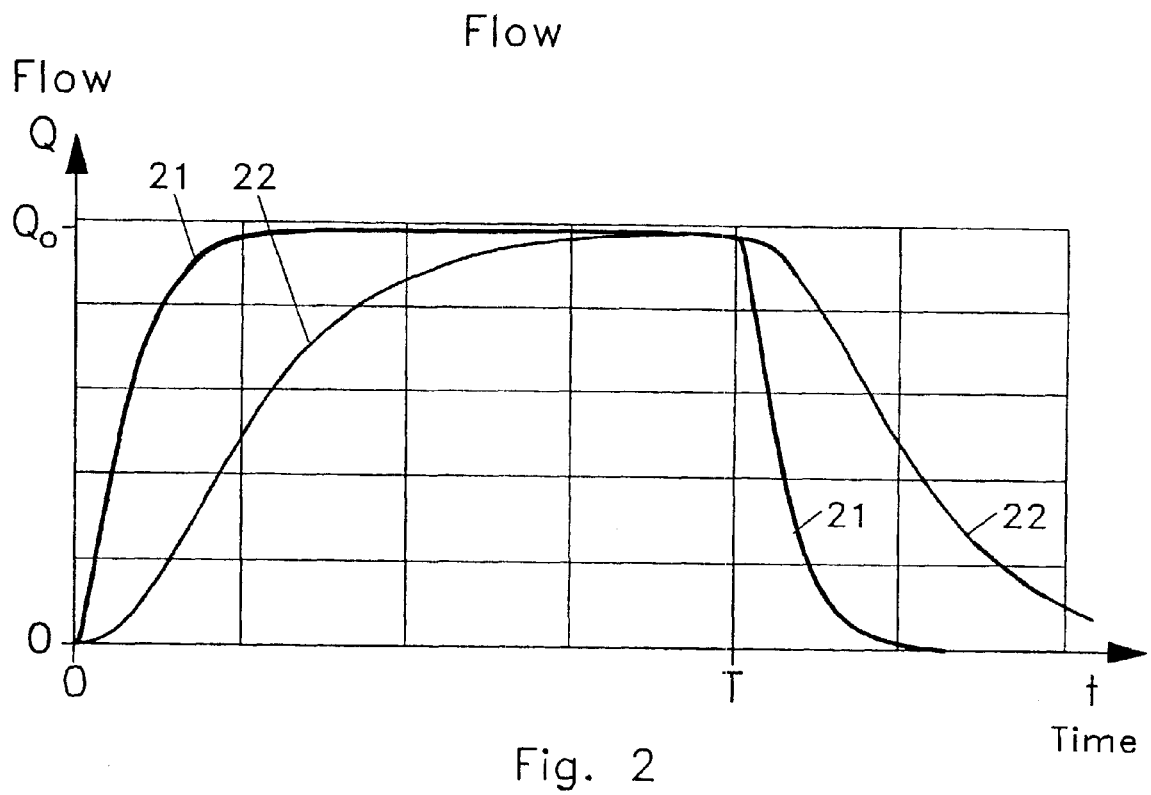
FIG. 2 show the actual flow and the measured flow in the system of FIG. 1.

The thick curve 21 in FIG. 2 illustrates the variation in time of the flow leaving the nozzle 3. The start signal is sent at t=0, and the stop signal is sent at t=T. When the valve 6 opens at t=0, the flow 21 gradually builds up to a maximum value $Q_0$. When the valve 6 receives the stop signal at t=T, it starts to close and the flow rate 21 is gradually reduced to zero. The flow signal 22 (thin line in FIG. 2), that is, the response of the flowmeter 5 typically lags somewhat behind the actual flow 21 through the meter. This lagging behaviour is also illustrated in FIG. 2.

Figure 3:
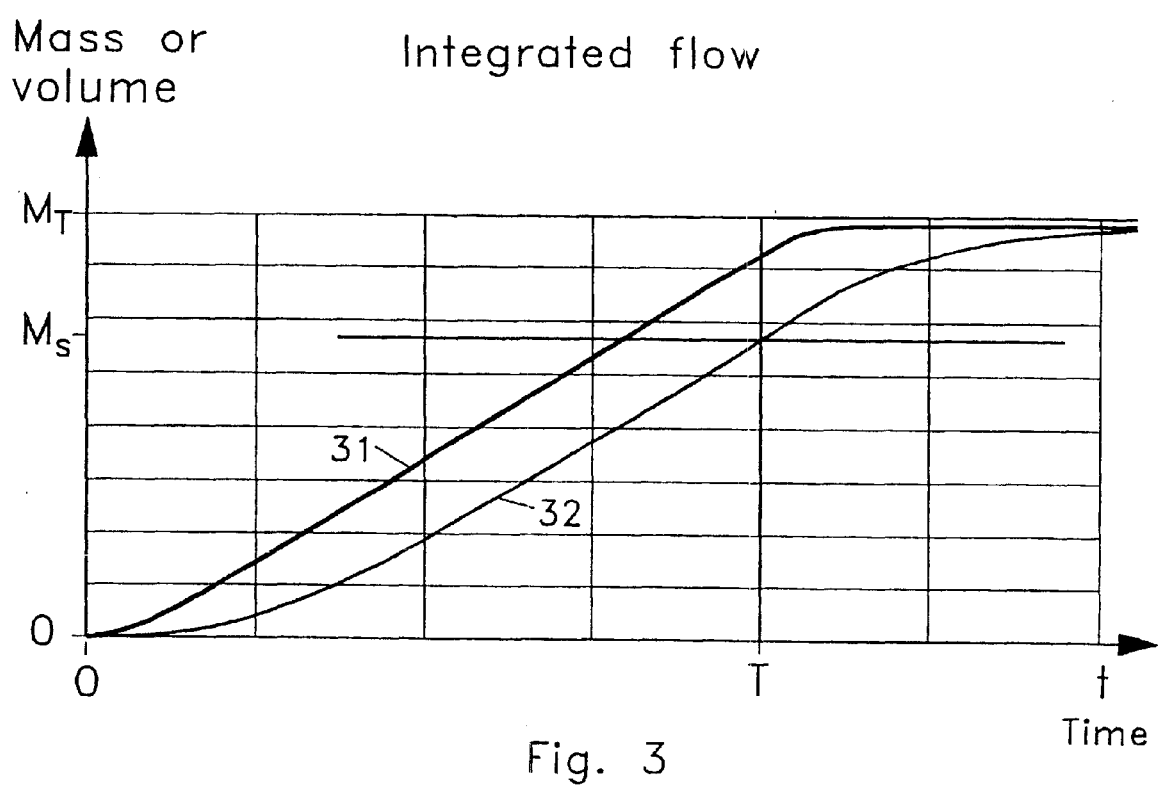
FIG. 3 is a diagram illustrating the mass or volume in the system of FIG. 1 as actually dispensed and as determined by an integrator receiving the flow signal.

The resulting mass or volume dispensed into the container 7 over time is illustrated in FIG. 3. The target batch size is indicated as $M_T$. The actual batch size development is illustrated by the thick line 31 whereas the measured batch size development, which results from an integration of the flow signal 22, is illustrated by the thin line 32.

It is evident from FIG. 3 that the combined effect of the flowmeter's time lag and the slow closing of the valve causes a need to generate the stop signal at a time T when the measured batch size is still below the target batch size $M_T$. The batch controller must therefore be set to trigger the stop signal when the dispensed mass or volume reaches the stop level $M_S$.

Figure 6:
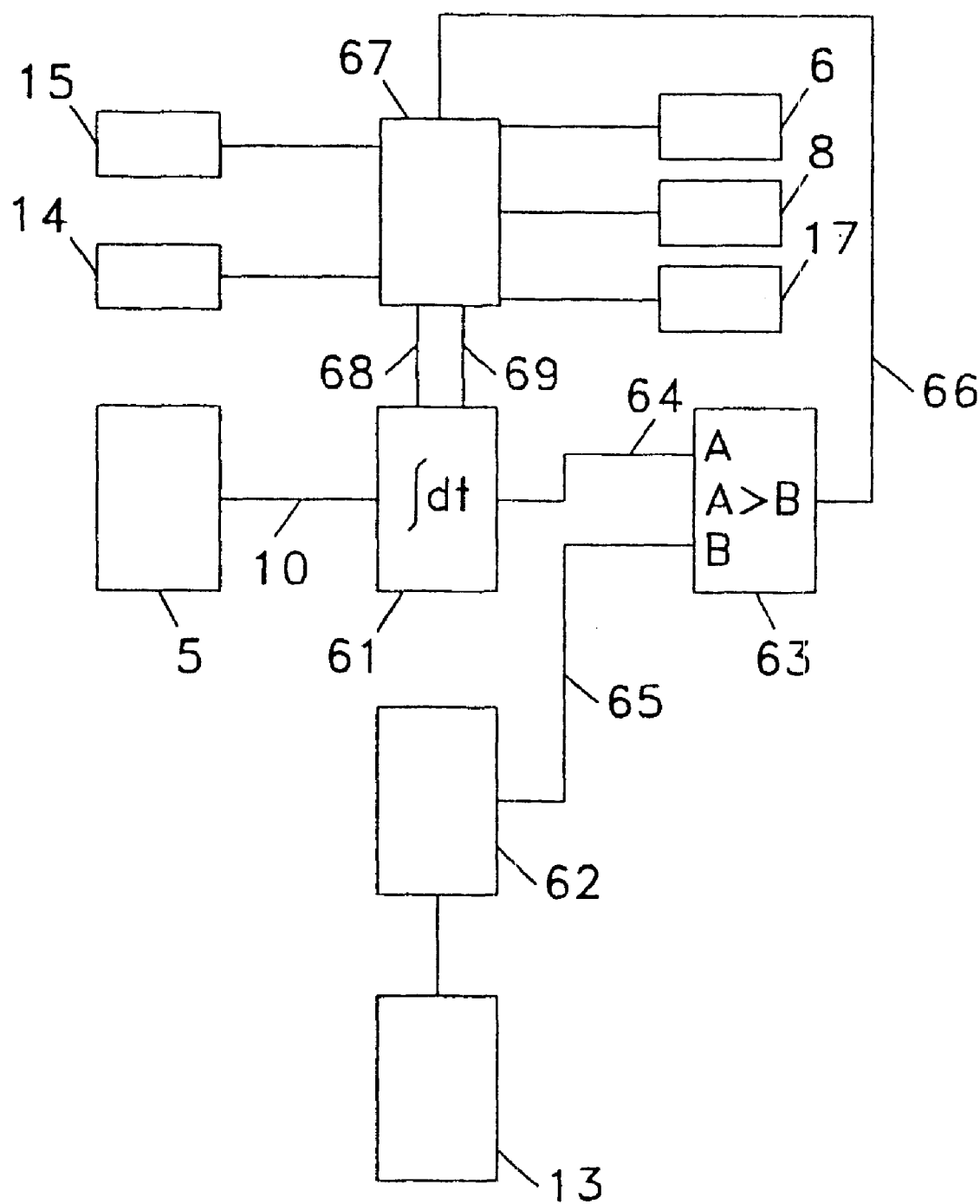
FIG. 6 is a block diagram of a prior art batch controller.

A simple prior art batch controller is shown in FIG. 6. A logic unit 67 is connected with the start and stop buttons 14 and 15. When the start button is pressed, the logic unit 67 resets and enables an integrator 61 via lines 68 and 69 and sends the start signal to the valve 6. The integrator 61 receives the flow signal 10 from flowmeter 5. A target batch size memory 62 is set to hold the target batch size using the keyboard 13. A comparator 63 compares the output signal 64 of the integrator 61 with the target batch size 65 and signals on line 66 when the target batch size is achieved. The logic unit 67 receives the trigger 66 and stops the flow. The logic unit also handles the conveying functions which need not be detailed.

In the prior art controller of FIG. 6, the target batch size 65 must be set to a value which is smaller than the actually desired batch size to compensate for flowmeter lag and slow valve closing, as has been explained above.

Figure 4:
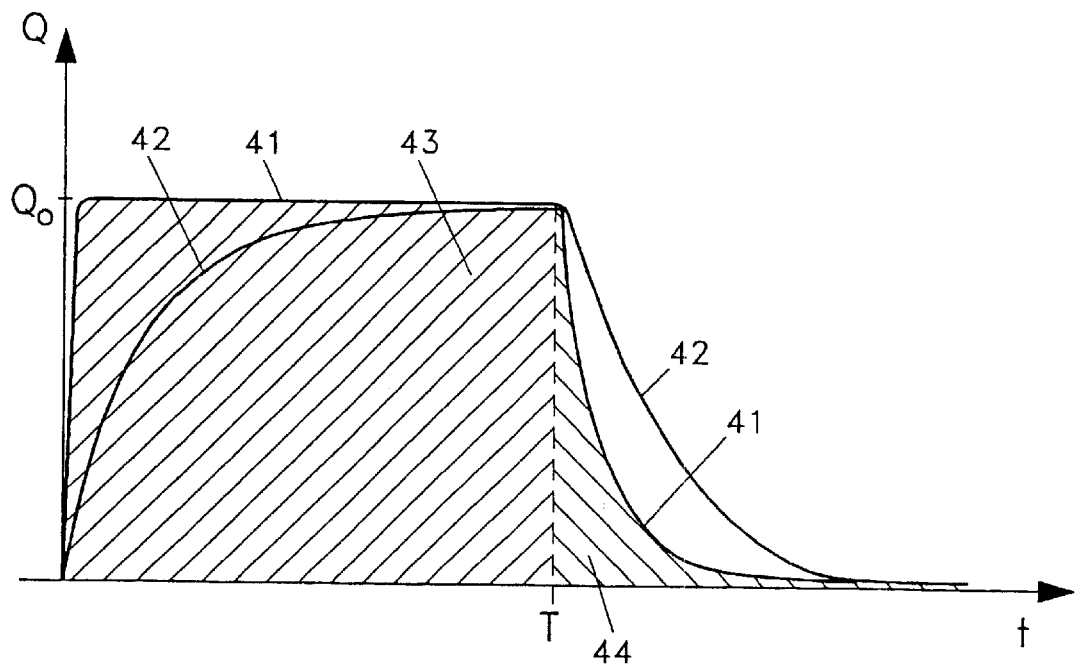
FIG. 4 is a diagram of the actual flow and the measured flow in a dispensing system which has been simplified for purposes of calculation.

In the diagram of FIG. 4 it is assumed for simplicity that the actual flow q, line 41, rises stepwise to its steady-state value $Q_0$ and that the step response 42 of the flowmeter signal $q_f$ is $$q_f(t)=Q_0(1-\exp(-t/\tau_f)) \qquad (1)$$

wherein $\tau_f$ is a characteristic time constant of the flowmeter.

The true batch mass or volume delivered up to the time T is $$M_T=Q_0T \qquad (2)$$

which is indicated as the hatched area 43 whereas the batch mass or volume measured by integration of the flowmeter signal, equation (1) above, is $$M_f = \int_0^T Q_0(1 - \exp(-t/\tau_f))dt \approx Q_0T - Q_0\tau_f \qquad (3)$$

The valve is also assumed for simplicity to close exponentially according to the equation $$q_v=Q_0\exp(-t/\tau_v) \qquad (4)$$

wherein $q_v$ is the flow out of the nozzle 3 during the closing of the valve, indicated as the part of curve 41 delimiting the hatched area 44 in FIG. 4, and $\tau_v$ is a characteristic time constant of the valve 6. The valve closing contributes an additional mass or volume which is dispensed after the time T, which may be found by integrating equation (4) as $$M_v = \int_T^\infty Q_0\exp(-t/\tau_v)dt = Q_0\tau_v \qquad (5)$$

and which is shown as hatched area 44. This results in a total actually delivered batch mass or volume of $$M_b=M_T+M_v=Q_0T+Q_0\tau_v. \qquad (6)$$

By combining equations (3) and (6) we find that $$M_f=M_b-Q_0(\tau_f+\tau_v) \qquad (7)$$

or, in words, the result of the integration of the flowmeter signal up to the time T when the stop signal needs to be given, is less than the mass or volume actually dispensed by the dispensing system, by the amount $Q_0(\tau_f+\tau_v)$.

In other words, with the assumptions of FIG. 4, the comparator must be set to trigger at the value $$M_S=M_b-Q_0(\tau_f+\tau_v) \qquad (7a)$$

to cause an exact dispensing of a desired batch mass or volume $M_b$.

Figure 5:
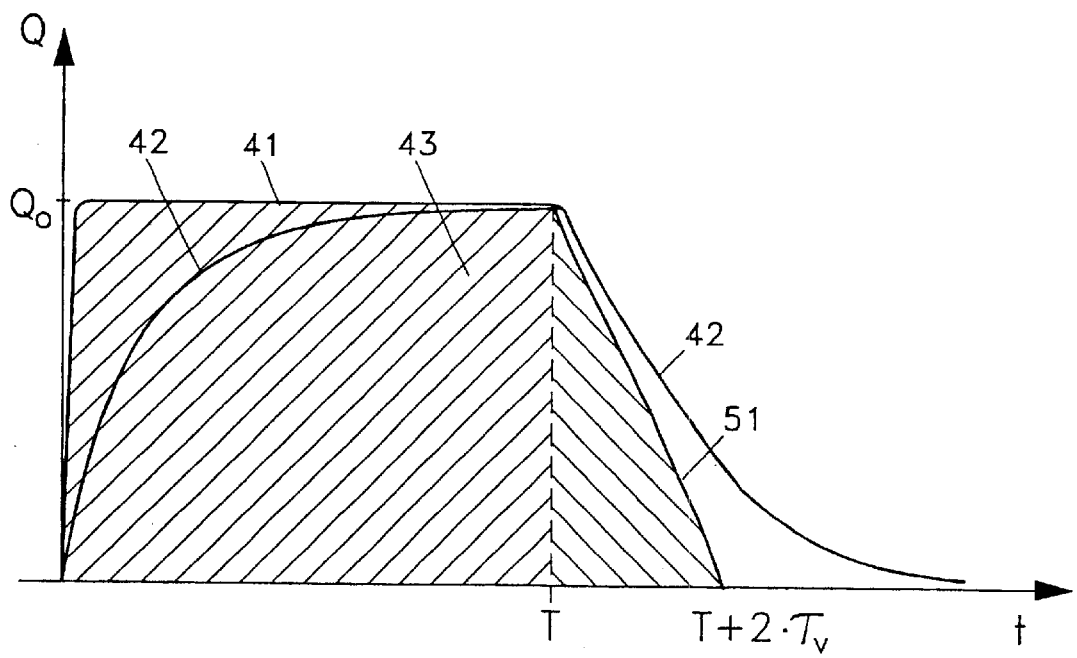
FIG. 5 is a diagram similar to FIG. 4 illustrating a different valve closing characteristic.

FIG. 5 serves to show that similar considerations apply if the valve closing characteristic is not exponential but linear as shown by line 51; it is immediately apparent that the mass or volume delivered during the closing of the valve is equal to $$M_v'=Q_0\tau_v' \qquad (8)$$

wherein $\tau_v'$ is defined as half the closing time of the valve. It can thus be said that the required comparator setting will generally be of the form of equation (7a) if $\tau_v$ is properly defined.

Referring now again to FIG. 1 it can be seen that the pressure in the feed line 4 will vary with the level h of the liquid in the storage tank 2. This pressure variation causes a variation in the steady state flow rate $Q_0$ which influences on the batch metering process.

With equation (7a) above rearranged as $$M_b = M_S + Q_0(\tau_f + \tau_v) \tag{9}$$

we will now consider the effect of a change $\Delta Q_0$ in the steady state flow rate $Q_0$ brought about by a change $\Delta P$ in the feed pressure in line 4. The change $\Delta Q_0$ will leave the trigger point setting $M_S$ of the comparator unchanged. This means that the amount $M_f$ metered out by the flowmeter before the comparator triggers the closing of the valve will remain unchanged, because the triggering will just occur correspondingly earlier or later in time. However, the change will bring about a change in the mass or volume which is actually dispensed but not measured by the flowmeter because of its lag time, and in the mass or volume $M_v$ which is dispensed during the closing of the valve. Thus the change $\Delta Q_0$ causes a change $\Delta M_b$ which can be expressed as $$\Delta M_b = (\tau_f + \tau_v)\Delta Q_0. \tag{10}$$

Requiring that the resulting batch mass or volume be unchanged ($\Delta M_b = 0$) we find that the target batch size or comparator setting must be changed correspondingly:

$$\Delta M_S = -(\tau_f + \tau_v)\Delta Q_0. \tag{11}$$

From an inspection of FIGS. 2 and 3 it becomes apparent that the flowmeter signal $q_f$ generally rises to the steady state flow value $Q_0$ well before the integrator reaches its setpoint $M_f$. This allows the generalization that equations (7) and (11) can be cast in the general form $$M_S = M_b - q_f(\tau_f + \tau_v) \tag{12}$$

which means that the target batch size value, or comparator setpoint $M_S$, may be allowed to float with the flowmeter signal $q_f$. Because of the inherent timing of the process the comparator trigger value $M_S$ will be in place and up-to-date with respect to the actual flow when the flow integration process gets near to it.

Figure 7:
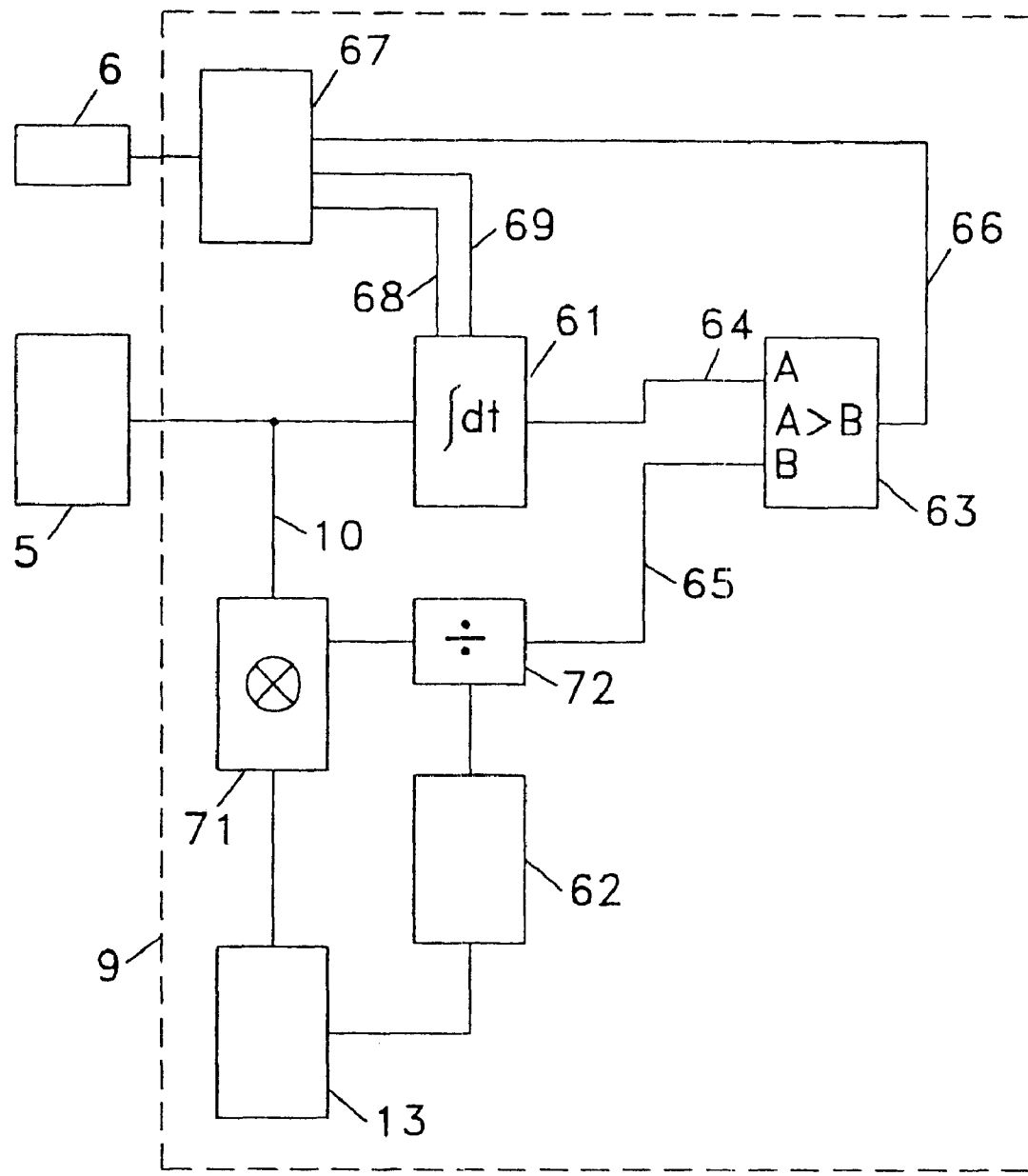
FIGS. 7 and 8 are block diagrams of a batch dispensing system with flow-dependent modification of the comparator triggering point.
Figure 8:
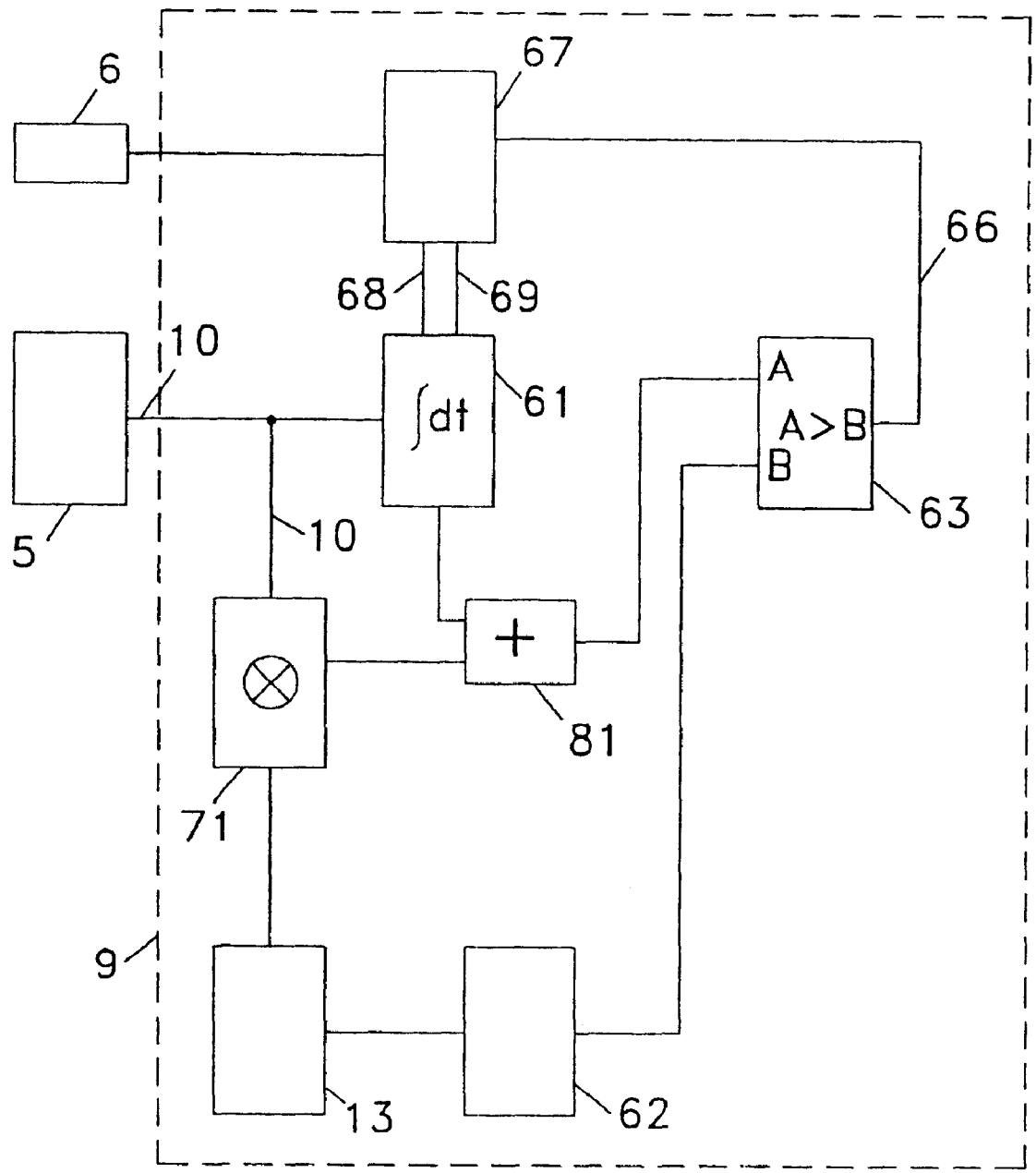

The batch dispensing systems shown in FIGS. 7 and 8 take advantage of this observation. In the system of FIG. 7, which shows a digital realization, the flow signal is delivered in the form of digital samples on line 10 to a multiplier unit 71 and to a an integrator 61. The sum of the system time constants $\tau_f + \tau_v$ is input to the multiplier unit 71 via the keyboard 13. The product $q_f(\tau_f + \tau_v)$ of the sum of the system time constants and the flowmeter signal generated by the unit is passed on to a subtracting unit 72 where it is subtracted from the target batch size held in the target batch size memory 62. The modified target batch size, or comparator trigger value $M_S$ is then passed on to the comparator 63 where it is compared to the integrated flow signal from integrator 71. This is a direct realization of equation (12).

In the dispensing system of FIG. 8 the product $q_f(\tau_f + \tau_v)$ generated by multiplier unit 71 is added to the output signal of integrator 61 by means of adder 81. The sum is then passed to the comparator for comparison with the target batch size value entered into the batch size memory 62 via the keyboard 13. This corresponds to a rearrangement of equation (12) to give the $M_b$ in terms of $M_S$ and $q_f(\tau_f + \tau_v)$. As in FIG. 7 the sum of the system time constants $\tau_f + \tau_v$ is input to the multiplier unit 71 via the keyboard 13. All other elements in FIGS. 7 and 8 perform the same functions as their counterparts in FIG. 6 having the same reference numbers, and elements 6, 8, 14, 15 and 17 have been omitted.

The systems of FIGS. 7 and 8 both require that modifications be made to the traditional batch controller shown in FIG. 6. It is possible, however, to achieve substantially the same flow-dependent correction of the target batch size by modification of the flowmeter. This will now be explained.

Starting from the slightly simplified situation of FIG. 4 and equation (1) again, we have $$q_f(t) = Q_0(1 - \exp(-t/\tau_f)) \tag{1}$$

If we add to this function its own time derivative multiplied by the system time constants $(\tau_f + \tau_v)$ and integrate the result, we arrive at $$\int_0^T q_f(t)dt + \int_0^T (\tau_f + \tau_v)\dot{q}_f(t)dt = \tag{13}$$

$$Q_0 T - Q_0 \tau_f + (\tau_f + \tau_v)\int_0^T \dot{q}_f(t)dt =$$

$$Q_0 T - Q_0 \tau_f + (\tau_f + \tau_v)(q_f(T) - q_f(0)) =$$

$$Q_0 T - Q_0 \tau_f + (\tau_f + \tau_v)Q_0 = Q_0 T + Q_0 \tau_v = M_b$$

wherein $\dot{q}_f$ means the time derivative of the flowmeter signal $q_f$.

This means that batch dispensing operation can be compensated for the combined effect of the lag time of the flowmeter and the closing time of the valve or stopping time of the pump by adding to the flowmeter signal $q_f$ its own derivate multiplied by the sum of the system time constants, and performing the integration on the sum. A flowmeter signal modified this way can be fed directly into a conventional batch controller such as that shown in FIG. 6.

Figure 9:
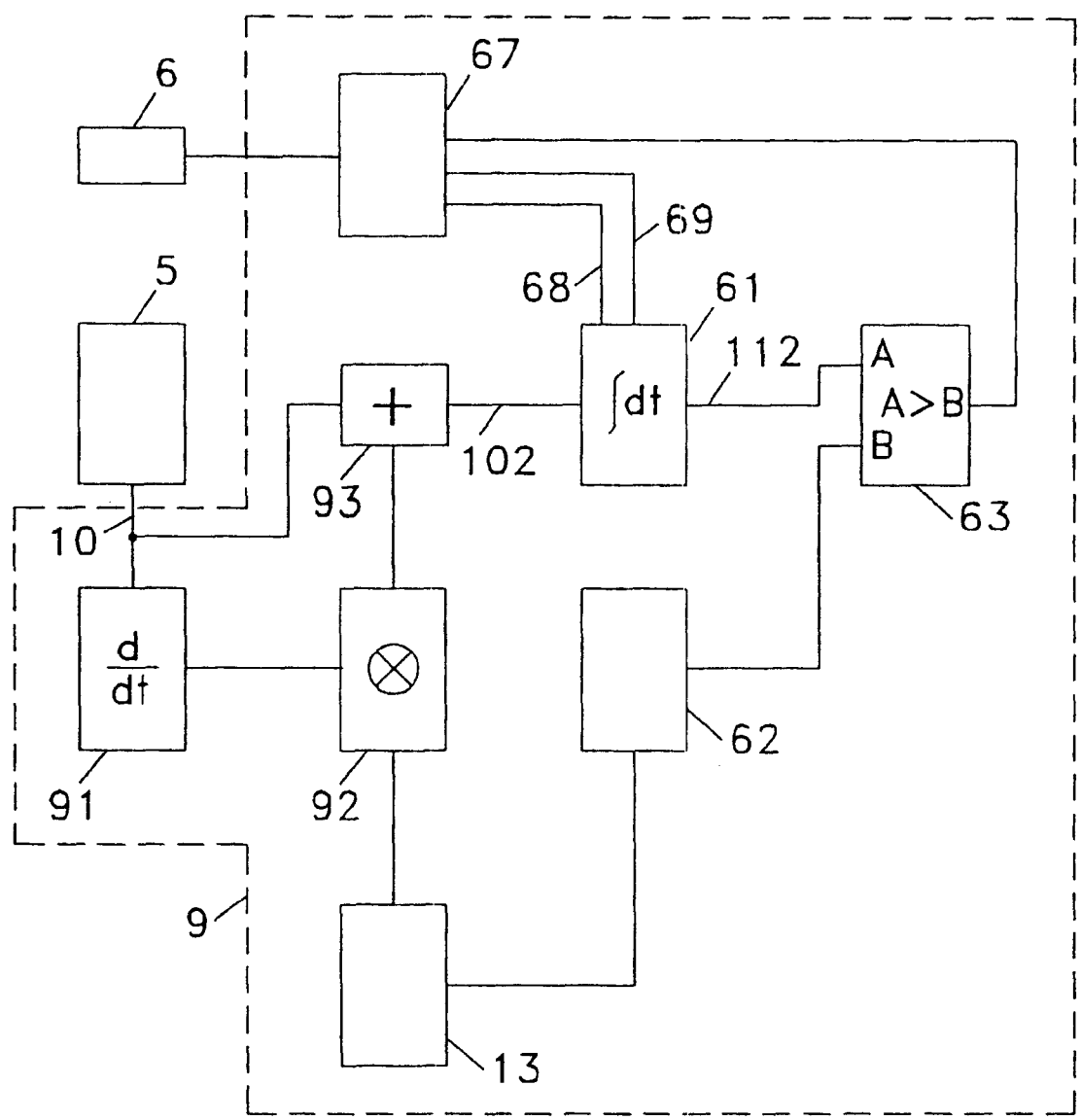
FIG. 9 is a block diagram of a batch dispensing system with lead compensation of the flow signal for use with an unmodified batch controller.

A batch dispensing system controller incorporating this approach is shown in FIG. 9. The flowmeter signal on line 10 is fed to a differentiating unit 91 which generates the time derivative of the flowmeter signal. A multiplier unit 92 receives the time derivative signal and multiplies it with the sum of the system time constants $(\tau_f + \tau_v)$ which has been entered using the keyboard 13. The multiplied derivative is added to the flowmeter signal by an adder 93, and the resulting sum is fed to the integrator 61. The comparator 63 compares the integrated sum signal to the target batch size in memory 62. In this instance, the target batch size can be entered directly; the operator does not need to make any manual compensation.

Figure 10:
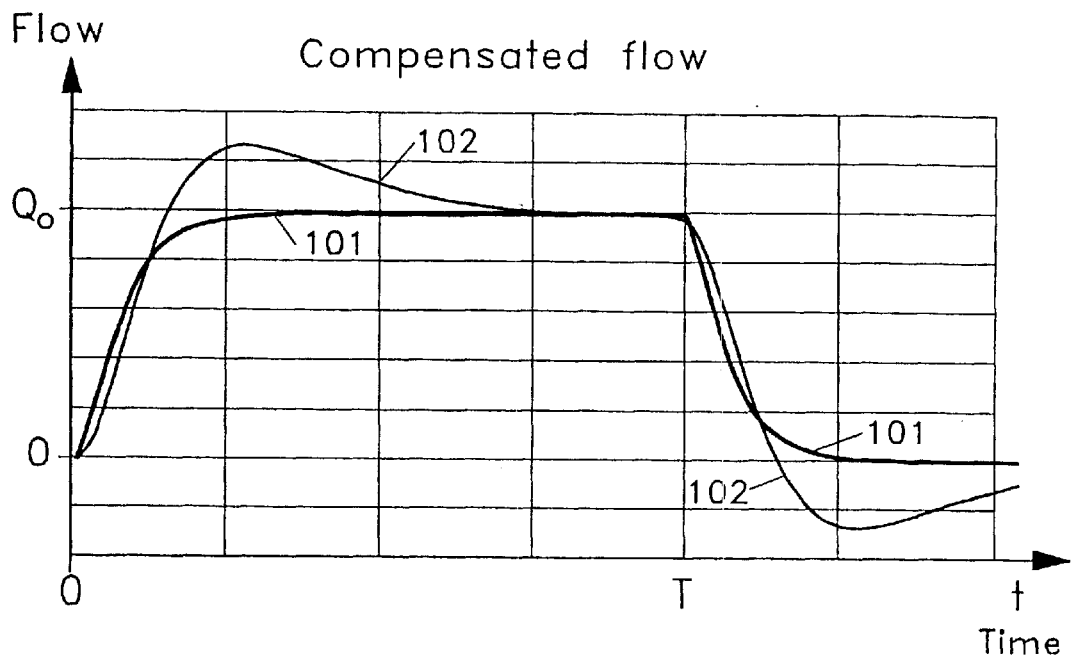
FIG. 10 shows the actual flow and a compensated flowmeter signal generated in the dispensing system of FIG. 9.

In FIG. 10, the thick curve 101 shows the actual flow dispensed from the nozzle 3 and the thin curve 102 shows the compensated flow signal at the output of the adder 93 in FIG. 9. It can be seen that the compensation causes an overshoot whose magnitude is dependent on the multiplication factor $(\tau_f + \tau_v)$ entered into the system of FIG. 9 via the keyboard 13.

Figure 11:
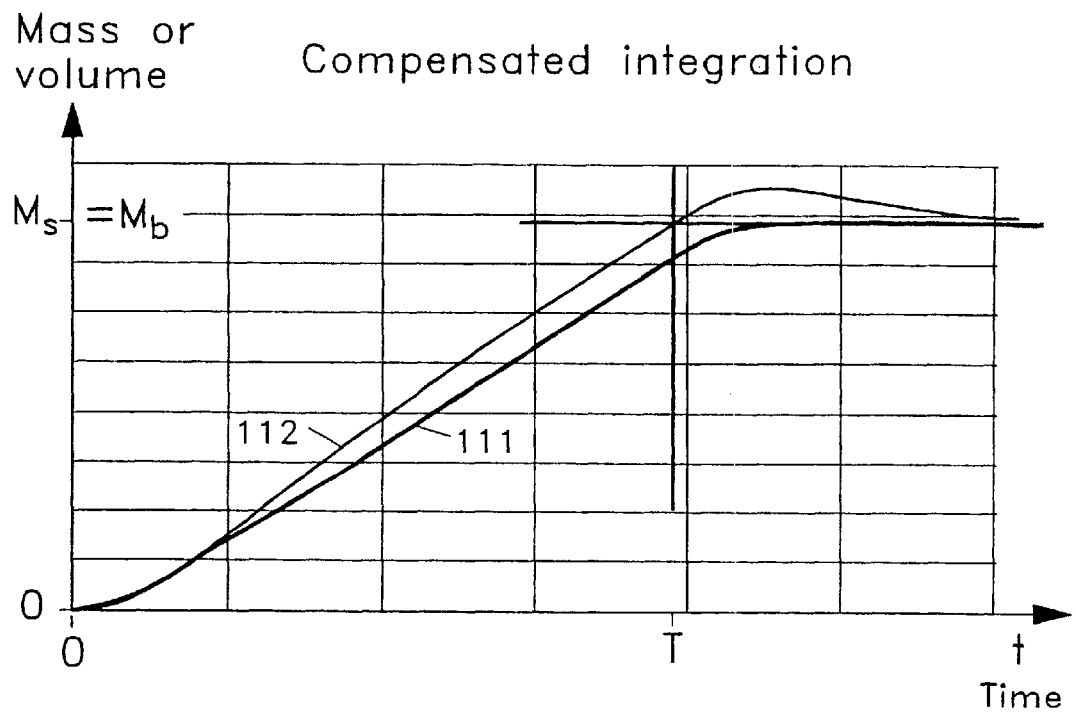
FIG. 11 is a diagram illustrating the mass or volume in the system of FIG. 9 as actually dispensed and as determined by the integrator receiving the compensated flowmeter signal.

The effect of the compensation on the comparator setpoint $M_S$ is illustrated in FIG. 11. The thick curve 111 shows the actual flow dispensed from the nozzle 3 (see FIG. 1) and the thin curve 112 shows the output signal of the integrator 61 in FIG. 9. The effect of the overshoot caused by the compensation of the flow signal is that the comparator can be set at $M_S = M_b$. The compensation will cause the integrated signal to reach $M_S$ early; thus the stop signal for the valve 6 (see FIG. 1) will be generated so early that the container is filled to the exact target batch mass or volume $M_b$ during the closing time of the valve 6.

Figure 12:
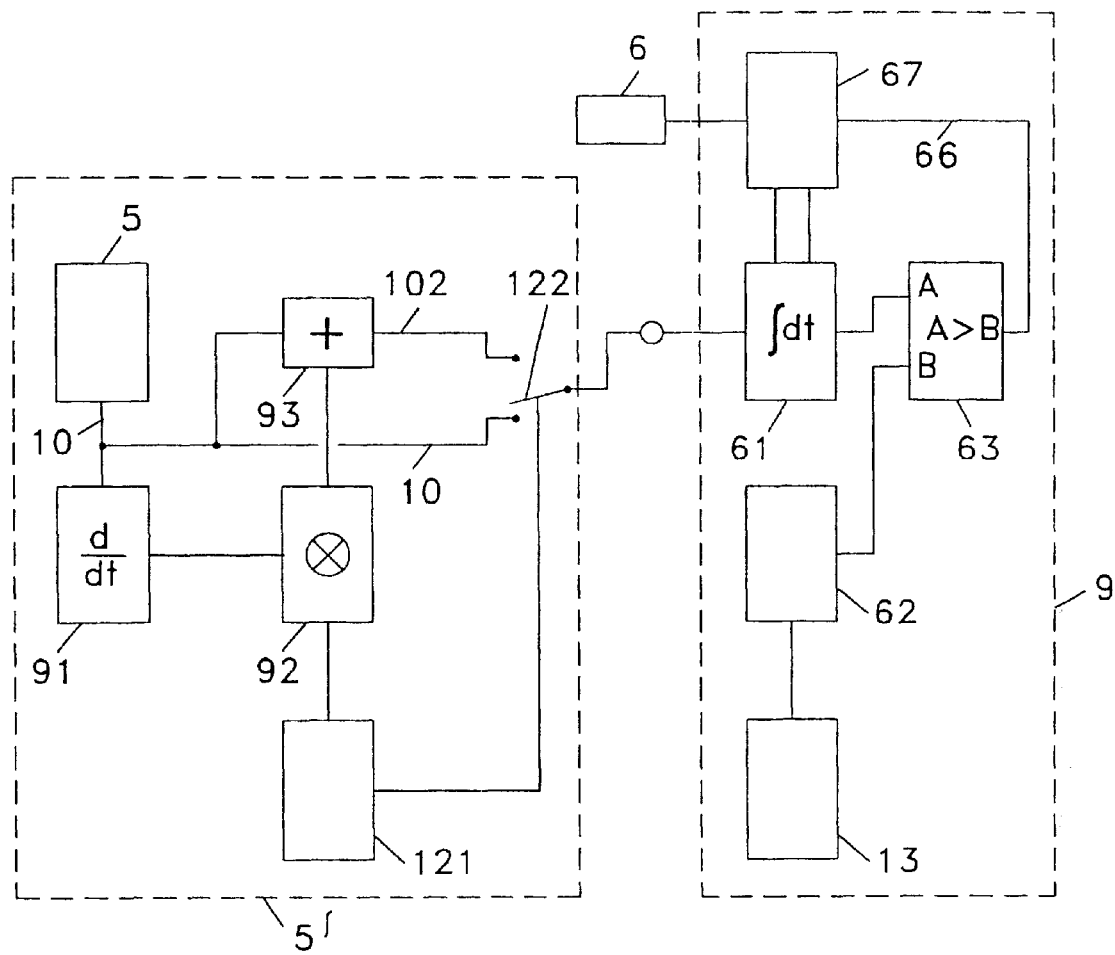
FIG. 12 is a block diagram of a modified flowmeter having batch metering functionality, which may be used with a conventional batch dispensing controller in a system similar to that of FIG. 1.

FIG. 12 shows substantially the same system as FIG. 9 wherein the flowmeter and the functional units for compensating the flowmeter signal have been united and supplemented with a separate keyboard 121 and a keyboard-controlled selecting switch 122 to provide a versatile batch flowmeter 5'. With the switch 122 in the position as shown, the flowmeter 5' functions as a conventional flowmeter. With the switch 122 in the other position, the output signal of the flowmeter 5' results from an addition of the flow signal 10 with its own time derivative muliplied by a compensation factor ($\tau_f+\tau_v$) which can be entered via the keyboard 121. Thus the flowmeter 5' can be switched to provide a normal flow signal or a flow signal compensated for batch metering, and the compensation is variable by entering the proper compensation factor via the keyboard. This allows an adaptation of the flowmeter 5' to batch dispensing systems having different closing times or stopping times of the dispensing valve or pump.

It should be mentioned in closing that the combined effect of generating a time derivative of the flow signal, multiplying the time derivative with a time constant to provide a multiplied derivative signal and adding the multiplied derivative signal to the flow signal can be performed by filtering the flow signal with a digital signal processing filter known as a variable lead filter.

Given a sequence of sampled flow signal values ($x_i$), the lead filter would be constructed to output a sequence of filtered signal values ($y_i$) formed as $$y_i = x_i + ((x_i - x_{i-1})(\tau_f + \tau_v)/t_{samp}) \tag{14}$$

wherein $t_{samp}$ is the sampling time interval.

The sequence ($y_i$) of samples generated by such a lead filter is equivalent to the modified flow signal 102 generated by the combination of the differentiator 91, the multiplier 92 and the adder 93 in FIG. 9, and digital summation of the sequence ($y_i$) is equivalent to the integration performed by integrator 61. In other words, the variable lead filter could be a single unit which would be substitued for the elements 91, 92 and. 93 in a digital realization of the principles of the invention. The lead filter would receive the time factor ($\tau_f+\tau_v$) from the keyboard 13 in FIG. 9.

I claim:

1. A batch flow meter for use in a system for dispensing batches of fluid, comprising:

a flowmeter for measuring a flow rate of the fluid and generating a flow signal corresponding thereto;

differentiation means for developing a derived signal representing a rate of change of the flow signal, and summation means for adding a representation of the derived signal to the flow signal to form a batch flow signal.

2. A batch flowmeter as in claim 1 further comprising input means for entering a compensation time constant and means for multiplying the derived signal with the compensation time constant to generate the representation of the derived signal.

3. A batch flowmeter as in claim 1 in which the representation of the derived signal includes a system time constant of a shut-off valve of the batch flowmeter.

4. A batch flowmeter as in claim 1 in which the representation of the derived signal includes a system time constant of the batch flowmeter.

5. A batch flowmeter as in claim 1 in which the representation of the derived signal includes a system time constant of a shut-off valve of the batch flowmeter and a system time constant of the batch flowmeter.

* * * * *